United States Patent [19]

Funada

[11] Patent Number: 4,462,368

[45] Date of Patent: Jul. 31, 1984

[54] FUEL INJECTION SYSTEM FOR INTERNAL COMBUSTION ENGINE

[75] Inventor: Takeo Funada, Higashi Matsuyama, Japan

[73] Assignee: Diesel Kiki Company, Ltd., Tokyo, Japan

[21] Appl. No.: 280,732

[22] Filed: Jul. 6, 1981

[30] Foreign Application Priority Data

Jul. 10, 1980 [JP] Japan ............................ 55-93262
Aug. 2, 1980 [JP] Japan ........................ 55-109127[U]
Aug. 4, 1980 [JP] Japan ........................ 55-109745[U]

[51] Int. Cl.³ .............................................. F02N 57/02
[52] U.S. Cl. ................................. 123/446; 123/447; 123/501; 123/425
[58] Field of Search ............... 123/501, 500, 502, 497, 123/499, 357, 447, 446; 239/88–95, 533.1–533.15, 585

[56] References Cited

U.S. PATENT DOCUMENTS

| | | | |
|---|---|---|---|
| 2,077,259 | 4/1937 | Planiol | 123/451 |
| 3,827,409 | 8/1974 | O'Neill | 123/447 |
| 3,875,912 | 4/1975 | Bullo | 123/425 |
| 4,082,481 | 4/1978 | Fenne | 123/447 |
| 4,213,180 | 7/1980 | Marchak | 123/479 |
| 4,217,862 | 8/1980 | Fort | 123/501 |
| 4,265,206 | 5/1981 | Garcea | 123/425 |
| 4,306,528 | 12/1981 | Straubel | 123/357 |

Primary Examiner—Charles J. Myhre
Assistant Examiner—Carl Stuart Miller
Attorney, Agent, or Firm—Jordan and Hamburg

[57] ABSTRACT

A source of high pressure fuel supply is hydraulically connected with a fuel tank or reservoir through a low pressure supply pump. Pressurized fuel from the high pressure fuel supply source is communicated to an injector which comprises a body having an axial bore therein and a plunger axially slidably received in the bore of the injector body. The injector body has a fuel induction passageway to which the pressurized fuel is communicated from the supply source while the plunger has a passageway means therein which is communicated with or communicable with the fuel injection passageway at one end thereof. Upon a reciprocal movement of the plunger, the passageway means at the other end is brought into or out of communication with a nozzle hole formed in the injector body by a controllable amount and duration thereby starting or terminating a controlled rate of injection of the pressurized fuel into an engine. The plunger is made up of first and second plunger parts which are connected together with the intermediary of a seal member. An isolation means formed as at least one seal ring is attached to a lower end portion of the plunger.

26 Claims, 5 Drawing Figures

FUEL INJECTION SYSTEM FOR INTERNAL COMBUSTION ENGINE

BACKGROUND OF THE INVENTION

The present invention relates to a fuel injection system for an internal combustion engine in which liquid fuel under high pressure is fed into a fuel injection valve or injector and charged therefrom into the engine by reciprocation of a plunger.

In an internal combustion engine, particularly a diesel engine, a fuel injection system has customarily been furnished with a relatively long delivery or injection tubing for hydraulic communication between a fuel injection pump and a fuel injection valve or injector. Fuel is pressurized by a plunger included in the pump and then fed to the fuel injector via the long injection tubing to be charged into the engine therefrom. With this system, the length, volume and other factors of the injection tubing have substantial influence on the supply of fuel under pressure by the plunger which makes it impossible to fully control the rate of injection at the injector through a control of the delivery rate at the plunger. For instance, even if a cam associated with the plunger moves the same angular distance driving the plunger to deliver fuel for the same time period, the injector may actually inject fuel for a time period which grows longer in accordance with the revolution speed of the engine. A difficulty is also experienced in controlling the quantity of injection in a particular range wherein the injection quantity is relatively small.

To settle these problems attributable to the long injection tubing, various types of unit injectors have hitherto been proposed which are commonly designed to omit an injection tubing by having an integral arrangement of a fuel injection pump and a fuel injection valve. A typical example of such unit injectors is disclosed in U.S. Pat. No. 4,069,800 assigned to the same assignee as the present application in which a servo piston is driven to compress fuel in a pressure chamber which communicates with a needle valve which is spring biased to block communication between the pressure chamber and a fuel injection nozzle. The servo piston which is of an automatic valve type is disposed in the injector body to be operated by hydraulic fluid pressure through a solenoid operated directional control valve or selector. High pressure fuel is supplied by the servo piston to an injector which is positioned at the end of the injector body, thus being charged into the engine at a high pressure. Such a unit injector succeeds in pressurizing low pressure fuel within the injector body up to a level high enough for the injection into the engine.

However, a unit injector of the type described cannot avoid various and critical problems originating from its inherent construction and arrangement. Provision of a servo piston in the injector body offers an intricacy of construction. A disproportionate mechanical strength is required for various portions of the injector body, particularly the seat of the valve needle of the injector, the stand the high fuel pressure. Meanwhile, the injection pressure of fuel on which the control of injection rate depends and injection timing, particularly time period or duration of direct injection, need be adjusted accurately in accordance with various demands of an engine to cut down fuel consumption, reduce engine noise and promote efficient exhaust emission control. The unit injector fails to meet this requirement for three different reasons: that the servo piston provides only a predetermined pressure of injection, that the injection starting timing is dependent solely on the pressure at which the needle valve will be opened by the high pressure fuel, and that a force necessary for closing the needle valve is so large that it is quite difficult to control the injection terminating timing. Additionally, the unit injector is unsuitable for use in a high speed engine because the supply of the working hydraulic fluid through the directional control valve limits the responsiveness of the servo piston.

SUMMARY OF THE INVENTION

A fuel injection system embodying the present invention comprises a source of high pressure fuel supply hydraulically connected with a fuel tank or reservoir which stores liquid fuel therein through a low pressure supply pump, injection valve means or injector means having a body formed with an axial bore and a nozzle hole, plunger means axially slidable in the axial bore of the body, the body having a fuel induction passageway means to one end of which high pressure fuel from the supply source is constantly communicated, the other end of the fuel induction passageway means being open into the axial bore of the body, the plunger means having a passageway means therein permitting hydraulic communication between the fuel induction passageway means of the body and the nozzle hole therethrough, and drive means driving the plunger means for a downward or injection stroke and an upward or return stroke in the axial bore of the body, whereby injection of fuel under pressure is started when the passageway means in the plunger means is communicated with the nozzle hole in the body upon an injection stroke of the plunger means and terminated when this communication is interrupted upon a return stroke of the plunger means.

In accordance with the present invention, a source of high pressure fuel supply is hydraulically connected with a fuel tank or reservoir through a low pressure supply pump. Pressurized fuel from the high pressure fuel supply source is communicated to an injector which comprises a body having an axial bore therein and a plunger axially slidably received in the bore of the injector body. The injector body has a fuel induction passageway to which the pressurized fuel is communicated from the supply source while the plunger has a passageway means therein which is communicated with or communicable with the fuel injection passageway at one end thereof. Upon a reciprocal movement of the plunger, the passageway means at the other end is brought into or out of communication with a nozzle hole formed in the injector body by a controllable amount and duration thereby starting or terminating a controlled rate of injection of the pressurized fuel into an engine. The plunger is made up of first and second plunger parts which are connected to each other with the intermediary of a seal member. An isolation means formed as at least one seal ring is attached to a lower end portion of the plunger at a specific level.

It is an object of the present invention to provide a fuel injection system in which an injector for injecting high pressure fuel and a source of high pressure fuel supply are formed independently of each other to simplify the construction of the system and minimize the mechanical strength necessary for various parts of the injector.

It is another object of the present invention to provide a fuel injection system which varies the quantity, pressure and duration of fuel injection readily yet accurately in conformity with the varying operating condition of an engine.

It is another object of the present invention to provide a fuel injection system in which the stroke of a plunger slidably received in a body of an injector is variable to control the rate of injection.

It is another object of the present invention to provide a fuel injection system which sharply responds to the varying operating condition of an engine thereby offering the engine an ideal combustion control.

It is another object of the present invention to provide a fuel injection system which cuts down fuel consumption, reduces engine noise and improves exhaust emission control.

It is another object of the present invention to provide a fuel injection system in which an injector has a plunger which can be machined with ease to have necessary passageways therein, so that the injector is producible with a minimum of production cost and with a dimentional accuracy readily achieved.

It is another object of the present invention to provide a fuel injection system which allows a plunger of an injector to be fully liquid-tight against high pressure fuel which will be admitted into the injector.

It is another object of the present invention to provide a fuel injection system which avoids leakage of pressurized fuel out of a predetermined path which would lead to incomplete combustion in an engine.

It is another object of the present invention to provide a fuel injection system which frees pressurized fuel in an injector from undesirable influence of combustion gas generated in an engine.

It is another object of the present invention to provide a fuel injection system which achieves an improvement in fuel metering accuracy.

It is another object of the present invention to provide a generally improved fuel injection system for an internal combustion engine.

Other objects, together with the foregoing, are attained in the embodiments described in the following description and illustrated in the accompanying drawings.

DESCRIPTION OF THE PREFERRED EMBODIMENTS

While the fuel injection system of the present invention is susceptible of numerous physical embodiments, depending upon the environment and requirements of use, substantial numbers of the herein shown and described embodiments have been made, tested and used, and all have performed in an eminently satisfactory manner.

Figure 1:
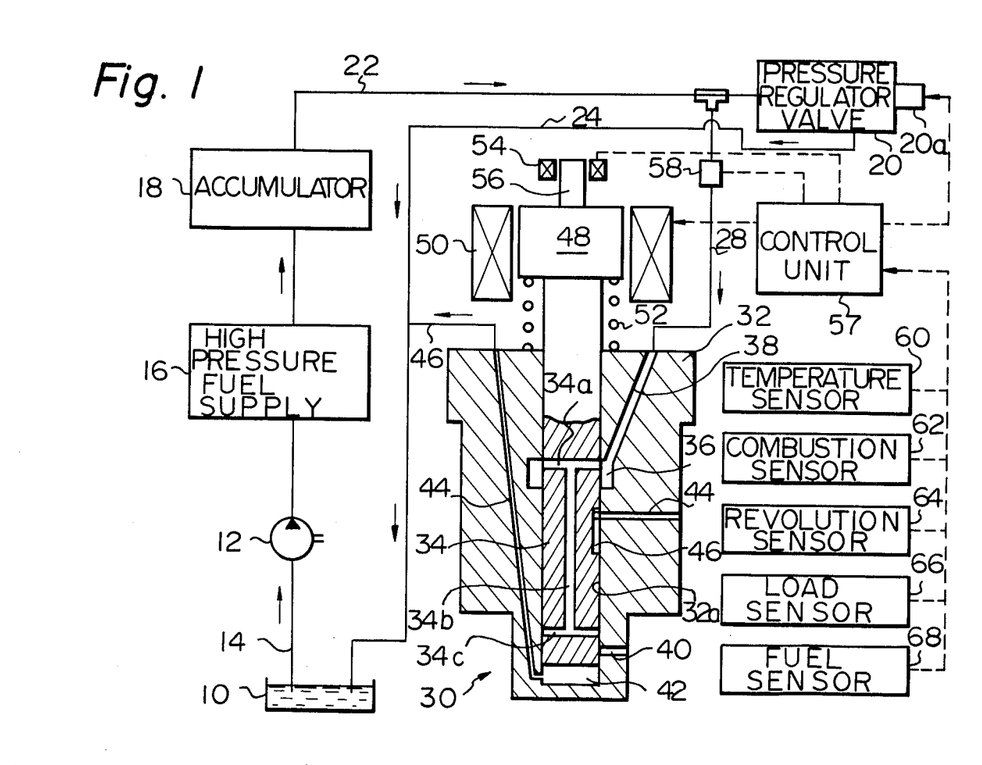
FIG. 1 is a schematic view of a fuel injection system according to the present invention which has an injector controlled by electromagnetic drive means.

Referring now to FIG. 1 of the drawings, a fuel reservoir or tank 10 is adapted to contain liquid fuel such as Diesel oil. A low pressure supply pump 12 pumps the fuel from the reservoir 10 through a low pressure fuel supply passageway or line 14. The pump 12 is hydraulically connected at its outlet to a source of high pressure fuel supply 16 which forms one of essential features of the fuel injection system according to the present invention. An accumulator 18 is provided at the outlet of the high pressure fuel supply 16 so that it absorbs the pressure variation of the high pressure fuel fed thereto from the high pressure fuel supply 16. The accumulator 18 has hydraulic communication with a pressure regulator valve 20 through a high pressure fuel supply passageway or line 22. The pressure regulator valve 20 is provided with a pressure control mechanism 20a and adapted to regulate the pressure of fuel to a predetermined level. Also, the pressure regulator valve 20 bypasses excess fuel from the fuel supply line 22 to a fuel return passageway or line 24 which leads to the fuel reservoir 10. A fuel supply passageway 28 branches off from the supply line 22.

A fuel injection valve means in the form of an injector generally designated by the reference numeral 30 comprises an injector body 32 having an axial bore 32a which is open at one end and closed at the other to define a cylindrical bottomed space for receiving a slidable valve member formed as a plunger 34. The injector body 32 is formed with an annular groove or recess 36 on the wall of the axial bore 32a. A fuel injection passageway 38 extends from the top of the injector body to merge into the annular groove 36 while being communicated with the passageway 28 as shown. The regulated fuel from the pressure regulator valve 20 will thus reach the annular groove 36 of the injector body via the passageways 28 and 38. The plunger 34 slidable axially up and down in the bore 32a is formed with a radial passageway 34a, an axial passageway 34b and a second radial passageway 34c all of which are communicated with each other. The radial passageway 34a is held in constant communication with the annular groove 36 of the injector body 32 whatever the position of the plunger 34 in the bore 32a may be. The axial passageway 34b extends along the axis of the plunger 34. The injector body 32 has a nozzle hole in the form of a radial through channel 40 adjacent to the lower end of the injector body 32. The second or lower radial passageway 34c of the plunger 34 will be brought into communication with the nozzle hole 40 when the plunger 34 moves downward substantially to the lower end of its stroke or bottom dead center as will be described.

If desired, the illustrated construction may be modified such that the plunger 34 has its radial passageway 34a and lower radial passageway 34c brought into communication with the annular groove 36 and nozzle hole 40 of the injector body 32, respectively, at a synchronous timing. Such simultaneous communication between the conjoint passageways will prove advantageous in minimizing the amount of fuel leakage which might occur while the nozzle hole 40 is being closed.

The lower end of the plunger 34 and the bottom of the bore 32a in the injector body 32 define therebetween a chamber 42 whose volume varies depending on the axial position of the plunger 34. A leak passageway 44 extends through the injector body 32 from the lower end of the bore 32a to the top of the injector body 32 whereat it connects to a leaked fuel return passageway or line 46 which in turn connects to the fuel return line 24. Any part of fuel leaked through between the sliding surfaces of the plunger 34 and injector body 32 will thus be fed back to the reservoir 1 via the passageway 44 and return lines 46, 24. Another function of the leak passageway 44 is to equilibrate the pressure inside the variable volume chamber 42 and thereby prevents the chamber 42 from forming a pressure chamber or a vacuum chamber against reciprocation of the plunger 34.

The injector 30 additionally includes a detent mechanism for preventing the plunger 13 from rotating about its axis. This mechanism comprises a pin 44 securely fit in the injector body 32 and an axial recess or slot 46 formed on the outer periphery of the plunger 34, the radially inner end of the pin 46 being received in the recess 44. While the detent mechanism 44, 46 obstructs rotational movements of the plunger 34, the pin 44 in the recess 46 serves to guide axial movements of the plunger 34.

A drive means for causing the plunger 34 to stroke upward and downward is located above the top of the injector body 32. A block of magnetic material 48 is rigidly carried on the upper end of the plunger 34 in coaxial relation therewith. An electromagnetic coil or winding 50 is fixed in place to surround the magnet block or core 48 at a suitable spacing from the latter. A return spring 52 is interposed between the opposing surfaces of the injector body 32 and magnet core 48 to yieldably support the magnet core 48 on the injector body 32. After a downward or injection stroke of the plunger 34 driven by the coil 50, the return spring 52 will urge the plunger 34 back to its raised inoperative position which is shown in FIG. 1.

The varying axial position of the plunger 34 is sensed by a stroke sensor 54 which cooperates with an upright member 56 rigid on the top of the magent core 48 and surrounded by the stroke sensor 54. The stroke sensor 54 comprises an ordinary type of stroke sensor which uses a coil or winding to detect a change in inductance in cooperation with the member 56.

The stroke sensor 54 is connected to an electric control unit 57 which functions to control the operations of the plunger drive coil 50 and the control mechanism 20a of the pressure regulator 20. Also connected to the control unit 57 is a pressure sensor or pickup 58 which is disposed in the passageway 28 between the pressure regulator valve 20 and injector body 32 to sense the hydraulic fluid pressure communicated to the passageway 38 and therethrough to the injector 30. Farther connected to the control unit 57 are a set of engine parameter sensors which comprise a temperature sensor 60 responsive to engine coolant temperature, intake air temperature and fuel temperature, a combustion sensor 62 responsive to the temperature inside the combustion chambers of the engine, a revolution sensor 64 responsive to the engine speed and the top dead center position of the piston in each engine cylinder, and a load sensor 66 responsive to the engine load. Additionally connected to the control unit 57 is a fuel sensor 68 which senses the quality and kind of fuel employed to power the engine. Receiving output signals of all these sensors, the control unit 57 compares them with optimum conditions for fuel control determined in advance with an actual engine whereupon a preprogrammed central processing unit or CPU processes the result of comparison. The control unit 57 controls the plunger drive coil 50 and control mechanism 20a to optimum or target conditions which conform to the then existing various factors mentioned above.

In operation, the annular groove 36 of the injector body 32 is always filled with high pressure fuel whose pressure has been regulated by the pressure regulator valve 20. In the condition shown in FIG. 1, the plunger 34 is in its raised inoperative position and the lower radial passageway 34c is blocked up by the wall of the bore 32a. The high pressure fuel therefore is constantly filled in the passageways 34a–34c of the plunger 34 which are communicated with each other and with the annular groove 36 of the injector body 32.

As the control unit 57 energizes the electromagnetic coil 50 at a controlled timing, the magnetic core 48 and therefore the plunger 34 are urged downward together against the counter force of the return spring 52. At the instant the plunger 34 moves downward sliding on the injector body 32 until the lower radial passageway 34c communicates with the nozzle hole 40, the fuel under regulated high pressure trapped in the passageways 34a–34c is injected through the nozzle hole 40 into the engine.

As the control unit 57 deenergizes the electromagnetic coil 50 at a controlled timing, the magnetic core 48 and therefore the plunger 34 are moved upward by the action of the return spring 52 back to the inoperative position. During this upward or return stroke of the plunger 34, the radial passageway 34c is brought out of communication with the nozzle hole 40 terminating the fuel injection.

It will be recalled here that the pressure inside the variable volume chamber 42 is constantly equilibrated by virtue of the leak passageway 44 and that the detent mechanism 44, 46 effectively avoids movements of the plunger 34 about its axis while guiding the axial reciprocation of the same.

With the construction and operation discussed above, it will be seen that the quantity of fuel injection can be adjusted by the pressure regulator valve 20 which in turn is controlled by the control unit 57. It will also be seen that the injection starting and terminating points in time can be controlled because the control unit 57 energizes and deenergizes the electromagnetic coil 15 at controlled timings, that is, communicates and discommunicates the radial passageway 34c of the plunger with the nozzle hole 40 at controlled timings in response to output signals of the revolution sensor 64 and stroke sensor 54. Furthermore, in a low speed operation range of the engine, the control unit 57 will cause the plunger 13 to move an optimumly limited stroke to thereby reduce the effective cross-sectional area of communication between the radial passageway 34c of the plunger 34 and the nozzle hole 40 of the injector body 32. The resultant decrease in the rate of injection in said specific range of engine operation will succeed in reducing engine noise and promoting favorable exhaust emission control.

Figure 2:
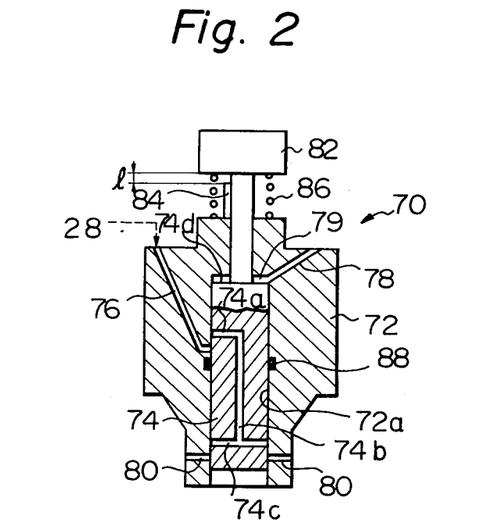
FIG. 2 is a fragmentary section of an injector according to a second embodiment of the present invention which is controlled by a hydraulic drive means.

While the injector has been shown and described as being operated by an electromagnetic drive means, it may be rearranged to be actuated by a hydraulic drive means as illustrated in FIG. 2 by way of example.

Referring to FIG. 2, the injector generally denoted by the reference numeral 70 comprises an injector body 72 and a plunger 74 which is axially slidably disposed in the injector body 72. The injector body 70 is formed with a fuel induction passageway 76 to which the fuel passageway 28 (phantom line) is connected to supply it with high pressure fuel which has been delivered from the source of high pressure fuel supply 18 and regulated by the valve 20 as in the case of FIG. 1. The fuel thus always fills the fuel induction passageway 76 of the injector body 70. The injector body 70 is also formed with a passageway 78 which is connected to a hydraulic fluid pressure source (not shown) by way of a directional control valve, a relief valve, an accumulator, a pump and the like in the well known manner. The plunger 74 has a shoulder 74d which defines a variable volume pressure chamber 79 between it and inner walls of an axial bore 72a of the injector body 72. The hydraulic fluid pressure from the source is introduced into this chamber 79 via the passageway 78 to act on the shoulder 74d which then defines a pressure receiving surface. The plunger 74 is formed with a radial passageway 74a which terminates halfway the diameter of the plunger, an axial passageway 74b extending downward from the radial passageway 74a along the axis of the plunger, and a second or lower radial passageway 74c communicated with the axial passageway 74b and selectively communicable with nozzle holes 80 provided to the injector body 72.

The plunger 74 carries at its top a block or abutment member 82 securely therewith. A stop member 84 extends upright from the top of the injector body 72 in a position where its upper end can be engaged by the abutment member 82. Interposed between the opposing surfaces of the abutment member 82 and injector body 72 is a return spring 86 which encloses the stop 84 thereinside and supports the abutment member 82 in a position spaced a predetermined distance l from the upper end of the stop 84. It should be born in mind that the passageways 76, 80 of the injector body 72 and the passageways 74a, 74c of the plunger 74 are such located that the passageway 74a communicates with the passageway 76 and the passageway 74c with the passageways 80 in synchronous relation when the plunger 74 moves downward through its full stroke which is the distance l the abutment member 82 moves until it engages with the stop 84. The reference numeral 88 indicates a seal member such as an O-ring nested in an annular recess formed in the injector body 72.

In operation, a hydraulic fluid from the source is admitted in the pressure chamber 79 via the passageway 78. The hydraulic fluid pressure building up in the chamber 79 acts on the pressure receiving surface of the plunger 74 which is defined by the shoulder 74d. As the fluid pressure overcomes the force of the spring 86, it moves the plunger 74 downward until the abutment member 82 is engaged with the stop 84, that is, by the distance l. Then, due to the aforesaid positional relationship, the radial passageway 74a of the plunger 74 is brought into communication with the passageway 76 of the injector body 72 while, at the same time, the radial passageway 74c is communicated with the nozzle holes 80. As a result, the high pressure fluid contantly communicated to the passageway 76 is routed through the passageways 74a, 74b, 74c to be injected from the nozzles 80 into the engine.

When the directional control valve in the hydraulic fluid line to the source is actuated to return the hydraulic fluid from the pressure chamber 79 back to the source, the chamber 76 is depressurized allowing the plunger 74 to be moved upward by the action of the spring 86. The radial passageway 74c of the plunger 74 is then discommunicated from the nozzle holes 80 to terminate the fuel injection.

Even with the hydraulically operated injector described above, the injection timing can be suitably adjusted if the directional control valve in the hydraulic fluid line to the chamber 79 comprises an electromagnetically operated directional control valve and is controlled by such a control unit as the one 57 shown in FIG. 1.

As shown, the bottom of the axial bore 72a in FIG. 2 is open, that is, the injector 70 is void of the chamber 22 indicated in FIG. 1 which defines a suction volume. Such a bottomless structure will additionally improve the composition of engine exhaust gas. Obviously, the axial bore 32a shown in FIG. 1 may also be formed throughout the injector body 32 to achieve the same effect.

The plunger 74 has been shown and described to be operated by a hydraulic fluid which is supplied to the injector 70 independently of the liquid fuel to be burned, but the liquid fuel may be directed to the chamber 76 in place of the independent hydraulic fluid. While the fuel injection has been effected in FIG. 2 in timed relation with the communication between the passageway 76 of the injector body 72 and the radial passageway 74a of the plunger 74, the high pressure fluid may be constantly trapped in the passageways 74a-74c of the plunger 74 as has been the case with the injector 30 shown in FIG. 1.

Now, in each of the fuel injectors 30 and 70 described with reference to FIGS. 1 and 2, the plunger 34 or 74 is formed as a slide valve member which is free to slide in the bore of the injector body or valve housing and, for this reason, it needs a relatively large axial length. Such a long plunger as a whole is difficult to produce due to the fact that troublesome machining is required to form the interconnecting passageways 34a-34c or 74a-74c in the plunger, particularly the axial passageway 34b or 74b, which have critical influence on the points in time to start and stop a fuel injection, fuel metering accuracy etc. To overcome this difficulty, a known plunger is made up of a suitable number of independent pieces which have been machined in advance to have such fluid passageways therein; the plunger pieces are connected together as by press fitting or spot welding. Such a plunger assembly, however, must be extremely precise in dimensions and surface roughness. Furthermore, the connection relying solely on fitting or welding cannot ensure the plunger complete liquid-tightness against high pressure fuel in view of the fuel pressure as high as about 1500 kg/cm$^2$ communicated to each of the passageways in the plunger; the plunger will become less fluid-tight particularly when its component parts are deformed in the course of welding operation.

Figure 3:
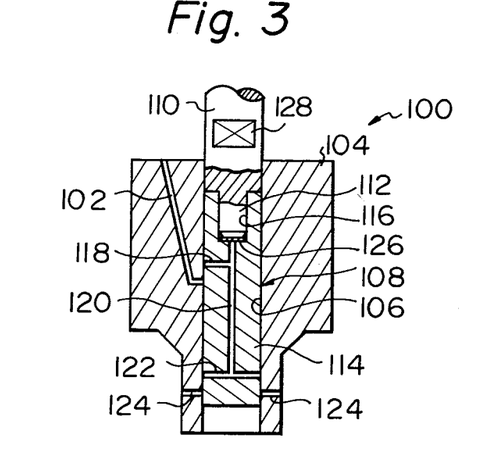
FIG. 3 is a fragmentary vertical section of an injector according to a third embodiment of the present invention in which a plunger is made up of two parts connected together through a seal member.

Referring to FIG. 3, there is shown a third embodiment of the present invention which precludes the drawbacks described above by having a plunger composed of two parts with a seal member interposed therebetween. Though not shown in the drawing, liquid fuel is fed from the tank or reservoir to the pressure regulator valve via the pump, source of high pressure fuel and accumulator as in the foregoing embodiments. From the pressure regulator valve, the fuel is routed into a fuel induction passageway 102 of the injector generally denoted by the reference numeral 100. The injector 100 comprises an injector body 104 formed with an axial bore 106 and a plunger 32 which is axially slidable in the bore 106.

The plunger 108 is made up of two parts: a first or upper part 110 from the lower end of which a given length of projection 112 extends downward coaxially therewith, and a second or lower part 114 formed with an axial bore 116 at its upper end which is so shaped and dimentioned as to received the projection 112 therein. A radial passageway 118 extends from a side of the lower plunger part 114 to a position halfway the diameter and, thereat, it joins an axial passageway 120 which extends from the bottom of the bore 116 along the axis of the plunger 108, that is, coaxially with the bore 116. The axial passageway 120 terminates at a second or lower radial passageway 122 which is open at diametrically opposite sides of the plunger. The reference numeral 124 designates nozzle holes formed throughout a lower portion of the injector body 104.

It will be seen from the construction shown that the axial passageway 120 of the lower plunger part 114 can be readily drilled from above after forming the bore 116.

The relative position of the fuel induction passageway 102 and radial passageway 118 and that of the radial passageway 122 and nozzle holes 124 are predetermined such that the passageway 118 registers with the passageway 102 and the passageway 122 with the nozzle holes 124 at the same time when the plunger 108 moves downward substantially to the lower end of its stroke or bottom dead center.

In operation, when the plunger 108 is moved downward for an injection stroke until the radial passageway 118 communicates with the passageway 102 and the radial passageway 122 with the nozzle holes 124, pressurized fuel constantly trapped in the passageway 102 is routed through the passageways 118, 120 and 122 to be injected into the engine from the nozzle holes 38. This is the start of a fuel injection. As the plunger 108 is moved back to its raised inoperative position, the communication between the passageway 118 and passageway 102 and that between the passageway 122 and nozzle holes 124 will be interrupted at timed relation terminating the fuel injection.

Concerning the assembly of the plunger 108, the lower plunger part 114 is first machined to have the intercommunicating passageways 118, 120 and 122. Then the upper plunger part 110 has its axial projection 112 press fit in the complementary bore 116 of the counter part 114 with the intermediary of a seal member 126. Alternatively, the projection 112 may be simply coupled in the bore 116 and then rigidly retained therein through the seal member 126 by spot welding the annular wall of the lower plunger part 114 to the projection 112 from therearound as indicated by arrows in the drawing.

The seal-member 39 serves to fully stop up the upper end of the axial passageway 120 of the lower plunger part 14 to thereby prevent the pressurized fuel from leaking to the outside of the plunger through the passageway 120. To so function, the seal member 39 is made of a material which is chemically resistant to liquid fuel employed, e.g. oil resistant rubber. It is more preferable, however, that the material be resistant to heat in addition to liquid fuel and pressure because the injector body 30 will be heated to a significantly high temperature by combustion gas during operation of the engine.

The upper plunger part 110 is provided with a suitable mark 128 which indicates positional relationship between the fluid inlet passageway 102 and nozzle holes 124 of the injector body 104 and the radial passageways 118 and 122 of the lower plunger part 114. The mark 40 will facilitate recognition of the relative position of such intercommunicable passageways from the outside of the assembly.

As in the embodiment discussed with reference to FIG. 2, the bottom of the axial bore 106 in the injector body 104 is open to eliminate the variable volume chamber 42 shown in FIG. 1 and thereby achieve an additional improvement in the composition of engine exhaust gas.

It will thus be seen that the injector 100 described above can be produced economically yet with precision because the upper and lower plunger parts 110 and 114 are connected together by press fitting the projection 112 in the bore 116 or spot welding the wall of the bore 116 to the projection 112 after simply coupling the latter in the former. The axial passageway 120 in the plunger extends from and coaxially with the axial bore 116. This promotes easy machining of the plunger to form such a passageway which has hitherto required troublesome work. Furthermore, the seal member 126 interposed between the upper and lower plunger parts 110 and 114 ensures liquid seal against pressurized fuel which will be communicated to the axial passageway 120 as has been described. Such complete liquid seal is maintained despite any deformation which might occur during spot welding.

As will be recalled, liquid fuel pressurized up to about 1500 kg/cm$^2$ is introduced into the radial and axial passageways of the injector 30, 70 or 100. The pressurized fuel therefore is likely to leak from the passageways into the nozzle hole or holes through between the axial bore of the injector body and the outer periphery of the plunger while the passageways are being closed by the wall of the axial bore. In case where a coolant is circulated through the plunger for cooling purpose, the coolant also tends to enter the nozzle hole or holes through the interface concerned, constituting a cause of incomplete combustion in the engine. When mounted to an engine, the injector will have the or each nozzle hole open directly into a combustion chamber of the engine. In this situation, even if the nozzle hole is closed, pressure and heat resulting from combustion will be inevitably transferred from the combustion chamber to the fuel trapped in the passageways of the plunger by way of the interface between the injector body and plunger. Furthermore, because the nozzle hole is directly open into the combustion chamber as mentioned, carbon particles contained in combustion gas are liable to be deposited on that edge portion of the nozzle hole which is adjacent to the plunger and plays a major role in metering the liquid fuel. This will degrade the fuel metering accuracy of the injector. With these in view, it is preferable to furnish the injector with some isolating or sealing means to cope with leakage of fuel and undesirable influence of combustion gas on fuel.

Figure 4:
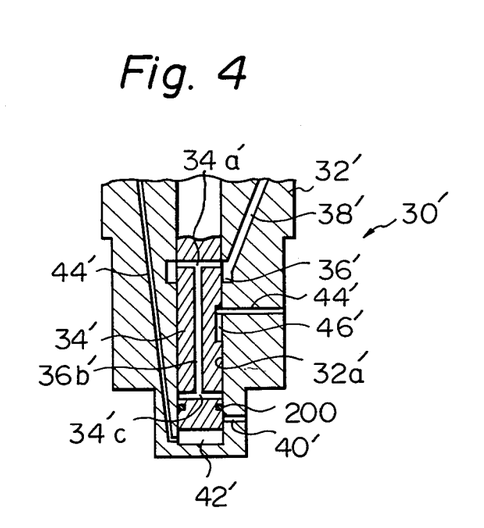
FIG. 4 is a fragmentary vertical section of an injector according to a fourth embodiment of the present invention which is furnished with sealing means.
Figure 5:
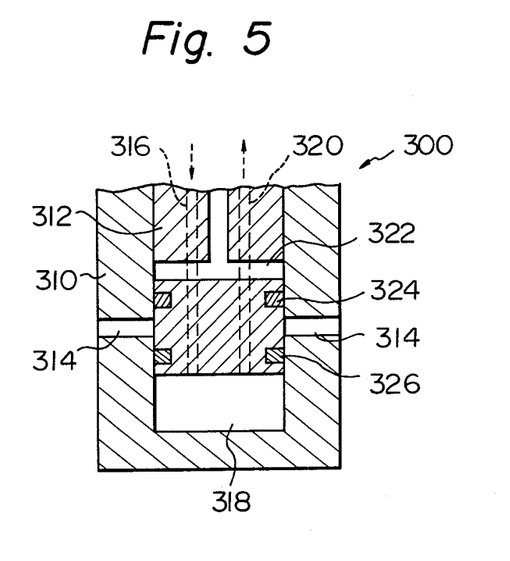
FIG. 5 is a partly cut away vertical section of an injector according to a fifth embodiment of the present invention which is provided with a modified form of the sealing means.

Referring to FIG. 4, there is shown a fourth embodiment of the present invention which is provided with an isolation means for the purpose described above. The injector shown in FIG. 4 is essentially similar to the injector 30 of FIG. 1 except for that part which is concerned with the isolation means and, therefore, the same parts and elements will be denoted by like reference numerals with primes.

In FIG. 4, the injector 30' includes a seal ring 200 which is received in an annular groove on the plunger 34'. Location of the seal ring 200 on the plunger 34' is such that it intervenes between the lower radial passageway 34c' of the plunger and the nozzle hole 40' of the injector body 32' when the plunger 34' is in its raised inoperative position or top dead center position. The seal ring 200 may be formed of metal.

During reciprocation of the plunger 34' in the axial bore 32a' of the injector body 32', the seal ring 200 on hydraulically isolates the nozzle holes 314 from the radial passageway 322 whereas the second seal ring 326 interrupts communication between the nozzle holes 314 and chamber 318. It will thus be seen that leakage of pressurized fuel from the radial passageway 322 to the nozzle holes 314 is prevented by the first seal ring 324 in the same way as the seal ring 200 of FIG. 4 and, in nozzle hole is interrupted upon the return stroke of said plunger means; and electric control means for controlling the operations of said drive means and said pressure regulator valve means, said electric control means comprising a control unit and pressure sensor means for sensing the injection pressure, said pressure sensor means comprising a pick-up means disposed in a passage which extends from said pressure regulator valve means to said injection valve means, said electric control means also comprising a stroke sensor means sensing the axial position of said plunger means, said electric control means further comprising revolution sensor means sensing the speed of said engine, whereby said electric control means is operable to control the operation of said drive means to thereby control the injection starting and terminating points at controlled timing and also to control the quantity of the injection of fuel in response to output signals from said stroke sensor means, said revolution sensor means and said pressure sensor means.

2. A fuel injection system as claimed in claim 1, wherein said electric control means is operable to move said plunger means a limited stroke to thereby reduce the effective cross-sectional area of communication between said fuel induction passageway means and said nozzle hole and thereby decrease the rate of fuel injection.

3. A fuel injection system as claimed in claim 1, wherein said limited stroke is effected during a low-speed operating range of the engine, whereby engine noise is reduced and favorable exhaust emission control is obtained.

4. A fuel injection system as claimed in claim 1, wherein the passageway means in the plunger means is held in constant communication with the fuel induction passageway means in the body to be constantly filled with the high pressure fuel.

5. A fuel injection system as claimed in claim 1, wherein the passageway means in the plunger means communicates with the fuel induction passageway means and the nozzle hole of the body in synchronism so that an injection of pressurized fuel from the nozzle hole takes place in synchronism with the supply of pressurized fuel into the passageway means in the plunger means.

6. A fuel injection system as claimed in claim 1, further comprising a detent means which prevents the plunger means from moving except for the axial direction.

7. A fuel injection system as claimed in claim 6, wherein the detent means comprises a pin fitted in the body and an axial recess or slot on the plunger means in which the radially innermost end of the pin is engaged.

8. A fuel injection system as claimed in claim 1, further comprising a spring which returns the plunger means to a raised inoperative position after an injection stroke is completed.

9. A fuel injection system as claimed in claim 1, wherein the axial bore of the body is defined by an annular side wall and a bottom wall and forms a variable volume chamber in combination with the lower end of the plunger received in the bore.

10. A fuel injection system as claimed in claim 9, wherein a fuel return passageway means extends throughout the body from the chamber to feed fuel leaked through between the plunger means and the wall of the axial bore back to the fuel reservoir.

11. A fuel injection system as claimed in claim 9, wherein the chamber forms a part of a coolant circulation path for cooling the plunger means during operation, the plunger means being formed with a coolant inlet passageway and a coolant outlet passageway which are commonly communicated with the chamber.

12. A fuel injection system as claimed in claim 1, wherein the axial bore of the body is open at the bottom.

13. A fuel injection system as claimed in claim 1, wherein the drive means comprises an electromagnetic drive means which consists of an electromagnetic coil coactive with a magnet core member carried on the plunger means.

14. A fuel injection system as claimed in claim 1, wherein the drive means comprises a hydraulic drive means which includes a directional control valve therein.

15. A fuel injection system as claimed in claim 14, wherein the directional control valve comprises an electromagnetically operated directional control valve.

16. A fuel injection system as claimed in claim 14, wherein a stop means is provided to limit the axial movement of the plunger means when the hydraulic drive means causes the plunger means into an injection stroke, the plunger means being returned to a raised inoperative position by a spring after the injection stroke.

17. A fuel injection system as claimed in claim 1, wherein the control unit is responsive to a temperature sensor means sensing engine coolant temperature, intake air temperature and fuel temperature, fuel sensor means sensing the kind and quality of liquid fuel used, combustion sensor means sensing combustion chamber temperature, speed sensor means sensing engine speed and top dead center position of a piston in each engine cylinder, and load sensor means sensing engine load.

18. A fuel injection system as claimed in claim 1, wherein the plunger means comprises an integral assembly of an upper plunger part and a lower plunger part which are connected together by connection means with a seal member interposed therebetween, said lower plunger part being formed with the passageway means.

19. A fuel injection system as claimed in claim 18, wherein the connection means comprises a projection coaxially extending from the lower end of the upper plunger part and a bore extending axially from the upper end of the lower plunger part to receive said extension on the upper plunger part therein, the seal member being seated on the bottom of the bore in the lower plunger part.

20. A fuel injection system as claimed in claim 18, wherein the passageway means comprises an axial passageway extending coaxially downward from the bore in the lower plunger, a first radial passageway communicated at one end with the fuel induction passageway means of the body and at the other end with said axial passageway, and a second radial passageway at which the axial passageway is terminated in communication therewith, the seal member being seated on the bottom of the bore in the lower plunger part to stop up the upper end of the axial passageway.

21. A fuel injection system as claimed in claim 18, wherein the seal member is made of a material which is resistant to liquid fuel, pressure and heat.

22. A fuel injection system as claimed in claim 21, wherein the seal member is made of oil-resistant rubber.

23. A fuel injection system as claimed in claim 18, wherein the upper plunger part is provided with a mark which indicates a relative position of the fuel induction passageway and nozzle hole of the body and the passageway in the lower plunger part.

24. A fuel injection system as claimed in claim 1, wherein at least one isolation means formed as a seal ring is fitted to a lower end portion of the plunger means to slidingly engage the wall of the axial bore in the body moving across the nozzle hole during reciprocation of the plunger means.

25. A fuel injection system as claimed in claim 24, wherein a seal ring is so positioned on the plunger means as to intervene between the passageway means in the plunger means and the nozzle hole of the body when the plunger means is in a raised inoperative position thereof.

26. A fuel injection system as claimed in claim 24, wherein a second seal ring is fitted to the plunger means to be positioned below the nozzle hole when the plunger means is in the raised inoperative position.

* * * * *